(12) United States Patent
Wade

(10) Patent No.: US 9,164,003 B2
(45) Date of Patent: Oct. 20, 2015

(54) FORCE SENSOR WITH MECHANICAL OVER-FORCE TRANSFER MECHANISM

(71) Applicant: HONEYWELL INTERNATIONAL INC., Morristown, NJ (US)

(72) Inventor: Richard A. Wade, Worthington, OH (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 268 days.

(21) Appl. No.: 13/649,887

(22) Filed: Oct. 11, 2012

(65) Prior Publication Data

US 2014/0102222 A1 Apr. 17, 2014

(51) Int. Cl.
| | | |
|---|---|---|
| *G01L 1/20* | (2006.01) | |
| *G01L 1/18* | (2006.01) | |
| *G01L 19/06* | (2006.01) | |
| *G01L 1/26* | (2006.01) | |

(52) U.S. Cl.
CPC ............. *G01L 1/18* (2013.01); *G01L 19/0618* (2013.01); *G01L 1/20* (2013.01); *G01L 1/26* (2013.01)

(58) Field of Classification Search
CPC ............. G01L 1/26; G01L 1/20; G01L 1/18
USPC ............. 73/777, 774, 763, 862.382, 862.451
See application file for complete search history.

(56) References Cited

U.S. PATENT DOCUMENTS

| | | | |
|---|---|---|---|
| 2,775,887 A * | 1/1957 | Hines ........................ | 73/862.382 |
| 3,353,410 A * | 11/1967 | Macneil ........................ | 73/715 |
| 3,695,100 A * | 10/1972 | Mitchell ................... | 73/862.584 |
| 4,891,985 A | 1/1990 | Glenn | |
| 5,353,003 A * | 10/1994 | Maurer ........................... | 338/47 |
| 5,499,041 A * | 3/1996 | Brandenburg et al. ........ | 345/174 |
| 5,661,245 A * | 8/1997 | Svoboda et al. ................ | 73/726 |
| 5,760,313 A * | 6/1998 | Guentner et al. ......... | 73/862.584 |
| 6,820,458 B2 | 11/2004 | Grzic | |
| 7,360,438 B2 * | 4/2008 | Gaines ........................... | 73/774 |

(Continued)

FOREIGN PATENT DOCUMENTS

DE 4129218 A1 * 3/1993 .............. G01P 15/02

OTHER PUBLICATIONS

"Shim". Oxford Dictionaries. Acessed online Aug. 29, 2014. <http://www.oxforddictionaries.com/us/definition/american_english/shim>.*

(Continued)

*Primary Examiner* — Lisa Caputo
*Assistant Examiner* — Jonathan Dunlap
(74) *Attorney, Agent, or Firm* — Ingrassia Fisher & Lorenz, P.C.

(57) ABSTRACT

A force sensor system includes a housing assembly, a sensor, an actuator, and an actuator travel stop. The sensor is disposed within the housing assembly, and is configured to generate a sensor signal representative of a force supplied to the sensor. The actuator is disposed at least partially within, and is movable relative to, the housing assembly. The actuator extends from the housing assembly and is adapted to receive an input force. The actuator is configured, upon receipt of the input force, to move toward, and transfer the input force to, the sensor. The actuator travel stop is disposed within the housing assembly, and between the housing assembly and a portion of the actuator. The actuator travel stop is configured to be selectively engaged by the actuator and, upon engagement by the actuator, to limit movement of the actuator toward, and the input force transferred to, the sensor.

7 Claims, 2 Drawing Sheets

(56) References Cited

U.S. PATENT DOCUMENTS

| | | | |
|---|---|---|---|
| 7,476,952 B2 | 1/2009 | Vaganov et al. | |
| 7,503,221 B2 | 3/2009 | Wade | |
| 7,726,197 B2* | 6/2010 | Selvan et al. | 73/777 |
| 7,913,579 B2* | 3/2011 | Mizuno | 73/862.69 |
| 8,327,715 B2* | 12/2012 | Bradley et al. | 73/774 |
| 8,427,441 B2* | 4/2013 | Paleczny et al. | 345/173 |
| 2004/0118214 A1* | 6/2004 | McDonald et al. | 73/756 |
| 2004/0187608 A1* | 9/2004 | Kurtz et al. | 73/862.391 |
| 2005/0132819 A1 | 6/2005 | Johnson et al. | |
| 2005/0178214 A1* | 8/2005 | Okada et al. | 73/862 |
| 2005/0217386 A1* | 10/2005 | Hirose et al. | 73/763 |
| 2007/0251328 A1* | 11/2007 | Selvan et al. | 73/777 |
| 2011/0000318 A1* | 1/2011 | Bradley et al. | 73/862.68 |
| 2012/0152037 A1* | 6/2012 | Wade | 73/862.627 |
| 2013/0247689 A1* | 9/2013 | Thanigachalam et al. | 73/862.627 |
| 2013/0247690 A1* | 9/2013 | Wade | 73/862.632 |
| 2013/0283933 A1* | 10/2013 | Liu et al. | 73/862.621 |

OTHER PUBLICATIONS

"Micro and Precision Engineering Research Group—Advanced writing tools" Katholieke Universiteit Leuven, Last update: Aug. 17, 2005; URL: http://www.mech.kuleuven.be/micro/topics/pen/index.en.html.

"Miniature Bending Beam Load Cell Model 8510" Burster Präzisionsmesstechnik Gmbh & Co, 2010, URL: http://www.burster.com/products/sensors.html?Load/Bending beam load cells/8510/19.

* cited by examiner

(12) United States Patent
US 9,164,003 B2

FORCE SENSOR WITH MECHANICAL OVER-FORCE TRANSFER MECHANISM

TECHNICAL FIELD

The present invention generally relates to force sensors, and more particularly relates to a force sensor with a mechanical over-force transfer mechanism.

BACKGROUND

Force sensors are used in myriad systems and environments. For some environments and systems, force sensors may need to provide relatively high resolution at relatively low force levels. To meet this need, some force sensors are configured to enhance the output signals by either increasing sensor sensitivity or by increasing the gain in the amplification stages of the signal processing circuitry. This latter approach can expose the design to potential noise issues, which can influence stability and accuracy. The former approach can make the sensor vulnerable to over-force events. While there are approaches that meet the need for higher resolution at low force levels, these approaches do not provide a force sensor that is both protected against an over-force event and compactly packaged.

Hence, there is a need for package level over-force protection for a force sensor that exhibits relatively high resolution at low force levels. The present invention meets at least this need.

BRIEF SUMMARY

In one embodiment, a force sensor system includes a housing assembly, a sensor, an actuator, and an actuator travel stop. The sensor is disposed within the housing assembly, and is configured to generate a sensor signal representative of a force supplied to the sensor. The actuator is disposed at least partially within, and is movable relative to, the housing assembly. The actuator extends from the housing assembly and is adapted to receive an input force. The actuator is configured, upon receipt of the input force, to move toward, and transfer the input force to, the sensor. The actuator travel stop is disposed within the housing assembly, and between the housing assembly and a portion of the actuator. The actuator travel stop is configured to be selectively engaged by the actuator and, upon engagement by the actuator, to limit movement of the actuator toward, and the input force transferred to, the sensor.

In another embodiment, a force sensor system includes a housing assembly, a sensor, an actuator, a force transfer gel, and an actuator travel stop. The housing assembly defines at least a sensor cavity. The sensor is disposed within the sensor cavity, and is configured to generate a sensor signal representative of a force supplied to the sensor. The actuator is disposed at least partially within, and is movable relative to, the housing assembly. The actuator extends from the housing assembly and is adapted to receive an input force. The actuator is configured, upon receipt of the input force, to move toward, and transfer the input force to, the sensor. The force transfer gel is disposed within the sensor cavity between the actuator and the sensor to transfer the input force to the sensor. The actuator travel stop is disposed within the housing assembly, and between the housing assembly and a portion of the actuator. The actuator travel stop is configured to be selectively engaged by the actuator and, upon engagement by the actuator, to transfer at least a portion of the input force to the housing assembly and limit movement of the actuator toward, and the input force transferred to, the sensor.

In still another embodiment, a force sensor system includes a housing assembly, a sensor, an actuator, and an actuator travel stop. The housing assembly has a sensor case and a cover coupled to the sensor case. The cover has an actuator opening formed therein. The sensor is disposed within the sensor section, and is configured to generate a sensor signal representative of a force supplied to the sensor. The actuator is disposed at least partially within, and is movable relative to, the housing assembly. The actuator extends through the actuator opening and is adapted to receive an input force. The actuator is configured, upon receipt of the input force, to engage, and transfer the input force to, the sensor. The actuator travel stop is disposed between the actuator and the cover, and is configured to be selectively engaged by the actuator and, upon engagement by the actuator, to transfer at least a portion of the input force to the housing assembly and limit movement of the actuator toward, and the input force transferred to, the sensor.

Furthermore, other desirable features and characteristics of the force sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
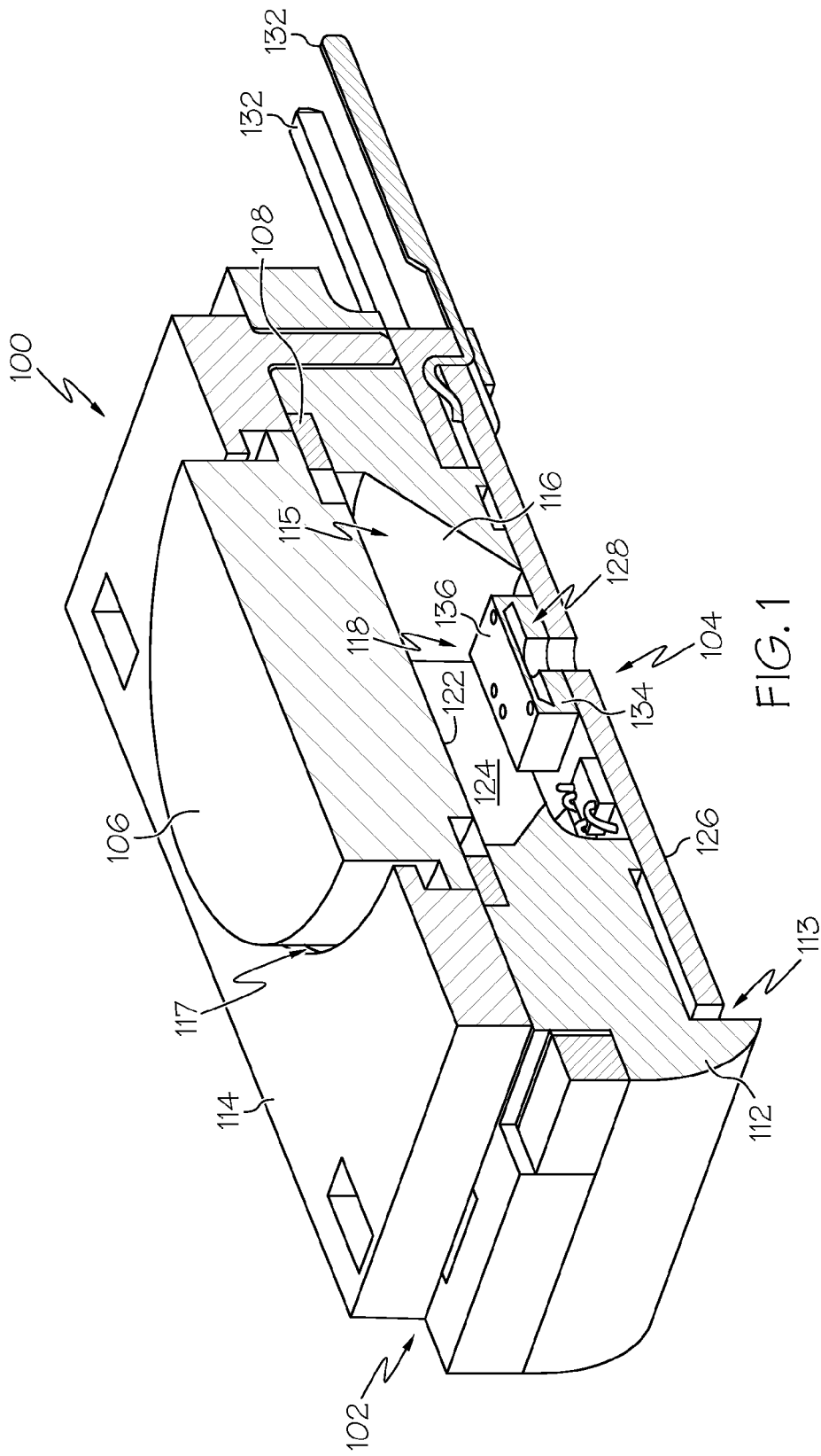
FIG. 1 depicts a cross section view of one embodiment of a force sensor.

Referring first to FIG. 1, a cross section view of one embodiment of a force sensor system 100 is depicted and includes a housing assembly 102, a sensor assembly 104, an actuator 106, and an actuator travel stop 108. The housing assembly 102 includes a sensor case 112 and a cover 114. The sensor case 112 includes a first opening 113, a second opening 115, and an inner surface 116 that defines a cavity 118 between the first and second openings 113, 115. The cover 114, which has an opening 117 formed therethrough, is coupled to the sensor case 112. The sensor assembly 104 is coupled to the sensor case 112 and spans the first opening 113, and a transfer mechanism 122 is coupled to the sensor case 112 and spans the second opening 115. Thus, the cavity 118 is enclosed. In the depicted embodiment, a force transfer medium 124 is disposed within the cavity 118. The force transfer medium 124 transfers an input force applied to the transfer mechanism 122, via the actuator 106, to the sensor assembly 104. In the depicted embodiment, the force transfer medium 124 is a suitable gel, but in other embodiments it may be a liquid, such as oil, or, as will be described further below, the actuator 106 may directly contact the sensor assembly 104.

The sensor assembly 104 includes a substrate 126 and a sensor 128. The substrate 126 is disposed over the first opening 113 of the sensor case 112, and is coupled to one or more output connector pins 132. The substrate 126 may have suitable circuit traces thereon, or other suitable means, for electrically coupling the sensor 128 to the output connector pin(s) 132. The sensor 128 is mounted on the substrate 126 via an adhesive, solder, or other suitable means and, at least in the depicted embodiment, includes a mount portion 134 and a diaphragm 136. The mount portion 134 is used to mount the sensor 128 to the substrate 126. The diaphragm 136 is formed in the mount portion 134, and has one or more sensing elements formed thereon that sense deflections of the diaphragm 136. The sensing elements may be piezoresistors, and may include signal conditioning circuitry. No matter its specific implementation, the sensor 128 is configured to generate a sensor signal representative of a force supplied thereto.

The actuator 106 is disposed at least partially within, and is movable relative to, the housing assembly 102. More specifically, at least in the depicted embodiment, the actuator 106 is extends through the opening 117 in the cover 114, and is movably captured between the sensor case 112 and the cover 114. The actuator 106 is adapted to receive an input force and is configured, upon receipt of the input force, to move toward, and transfer the input force to, the sensor 128. The actuator 106 depicted in FIG. 1 is a substantially round, button-shaped device. It will be appreciated, however, that this is merely exemplary of one configuration, and that the actuator 106 could be variously configured and implemented.

The actuator travel stop 108 is also disposed within the housing assembly 102, and, at least in the depicted embodiment, is disposed between the housing assembly 102 and a portion of the actuator 106. The actuator travel stop 108 is configured be selectively engaged by the actuator 106 and, upon engagement by the actuator 106, limits the movement of the actuator 106 toward the sensor 128, and thus also limits the input force transferred to the sensor 128. Although the configuration and implementation of the actuator travel stop 108 may vary, in the depicted embodiment the actuator travel stop 108 is implemented using a shim. It will be appreciated that in other embodiments, the actuator travel stop 108 could be formed integral with housing assembly 102. For example, it could be formed as an integral lip or as a raised bead that collapses slightly upon application of a predetermined force. In other embodiments, the actuator travel stop 108 could be formed on the actuator 106.

Figure 2:
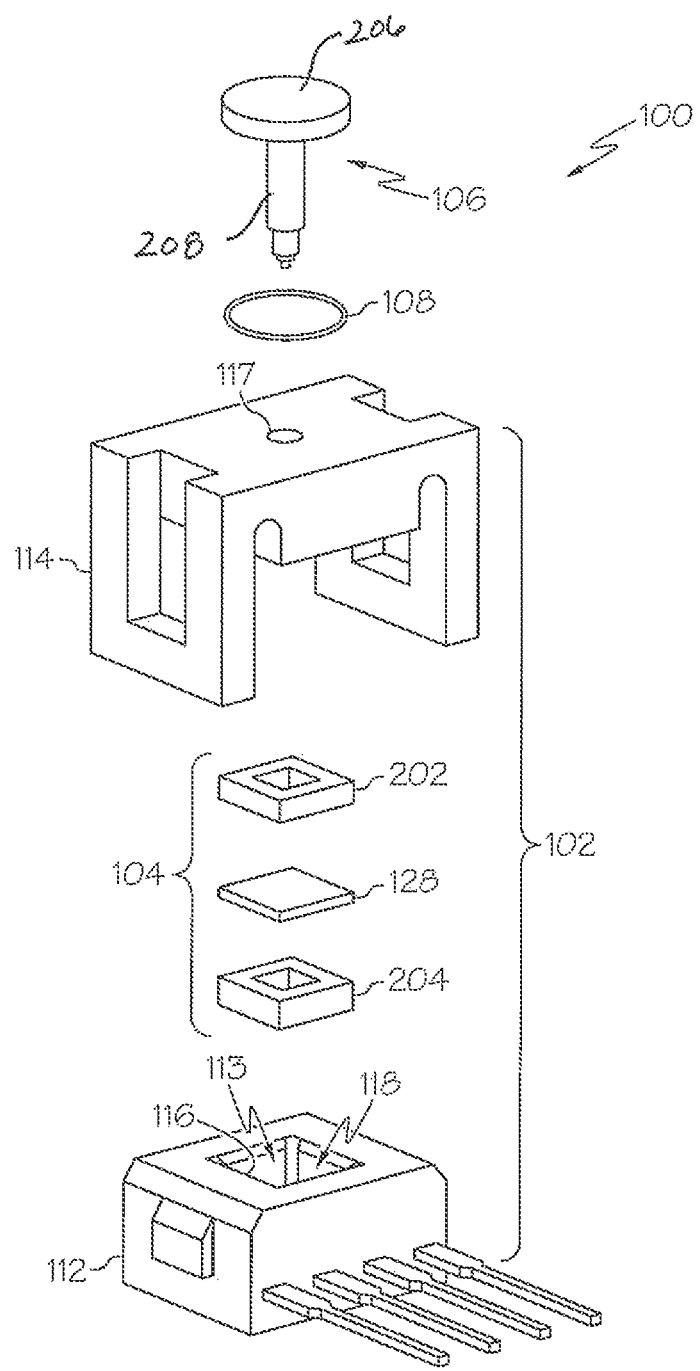
FIG. 2 depicts an exploded plan view of another embodiment of a force sensor.

It was noted above that in some embodiments, the actuator 106 may directly contact the sensor assembly 104. One such embodiment is depicted in FIG. 2, and will now be described. In doing so, it is noted that like reference numerals in FIGS. 1 and 2 refer to like components. The depicted force sensor system 200 includes a housing assembly 102, a sensor assembly 104, an actuator 106, and an actuator travel stop 108. The housing assembly 102 includes a sensor case 112 and a cover 114. The sensor case 112 includes a first opening 113, and an inner surface 116 that defines a cavity 118. The cover 114, which has an opening 117 formed therethrough, is coupled to the sensor case 112 and covers the first opening 113. The sensor assembly 104 is disposed within the cavity 118, and is coupled to the sensor case 112.

The sensor assembly 104 includes an upper seal 202, a lower seal 204, and a sensor 128. The upper seal 202 is disposed between the cover 114 and the sensor 128. The lower seal 204, which is preferably a conductive seal, is disposed between the sensor 128 and the sensor case 112, and electrically couples the sensor to one or more output connector pins 132. The sensor 128 may be mounted on the lower seal 204 via any one of numerous suitable means and, at least in the depicted embodiment, is implemented similar to the sensor 128 depicted in FIG. 1. No matter its specific implementation, the sensor 128 is configured to generate a sensor signal representative of a force supplied thereto.

The actuator 106 is disposed at least partially within, and is movable relative to, the housing assembly 102. More specifically, at least in the depicted embodiment, the actuator 106 extends through the opening 117 in the cover 114, and is movably captured therein. The actuator 106 is adapted to receive an input force and is configured, upon receipt of the input force, to move toward, and transfer the input force to, the sensor 128. The actuator 106 depicted in FIG. 2 includes a substantially round, button-shaped input device 206 having a force transfer pin 208 coupled thereto. It will be appreciated, however, that this is merely exemplary of one configuration, and that the actuator 106 could be variously configured and implemented.

The actuator travel stop 108 is disposed between the housing assembly 102 and a portion of the actuator 106. In particular, it is disposed between the input device 206 and the cover 114. As with the previous embodiment, the actuator travel stop 108 is configured to be selectively engaged by the actuator 106 and, upon engagement by the actuator 106, limits the movement of the actuator 106 toward the sensor 128, and thus also limits the input force transferred to the sensor 128. Although the configuration and implementation of the actuator travel stop 108 may vary, in the depicted embodiment the actuator travel stop 108 is implemented using a shim. It will be appreciated that in other embodiments, the actuator travel stop 108 could be formed integral with housing assembly 102. For example, it could be formed as an integral lip or as a raised bead that collapses slightly upon application of a predetermined force. In other embodiments, the actuator travel stop 108 could be formed on the input device 206.

In all of the embodiments described herein, the actuator travel stop 108 is sized so that the sensor 128 can supply its full-scale output, yet limit the movement of the actuator 106 to an amount that is well below the burst force of the sensor 128. Placing a properly sized actuator travel stop 108 between the actuator 106 and the housing assembly 102 limits the amount of actuator over-travel, and concomitantly limits the force transferred to the sensor 128. In one particular embodiment, the force is limited to two times the active range of the sensor 128. Any forces greater than this are transferred to the actuator travel stop and then to the housing assembly 102 and the external environment.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A force sensor system, comprising:
    a housing assembly including a sensor case and a cover, the cover having an actuator opening formed therein;
    a sensor disposed within the sensor case, the sensor having an active range and configured to generate a sensor signal representative of a force supplied to the sensor;
    an actuator disposed at least partially within, and movable relative to, the housing assembly, the actuator extending through the actuator opening and adapted to receive an input force, the actuator configured, upon receipt of the input force, to move toward, and transfer the input force to, the sensor; and
    an actuator travel stop disposed within the housing assembly, and between the housing assembly and a portion of the actuator, the actuator travel stop configured to be selectively engaged by the actuator and, upon engagement by the actuator, (i) limits movement of the actuator toward, and the input force transferred to, the sensor and (ii) transfers at least a portion of the input force to the housing assembly,
    wherein:
        the actuator travel stop is sized so as to limit the input force transferred to the sensor to a maximum of two times the active range of the sensor, and
        the actuator travel stop comprises a shim that is disposed between and contacts both the sensor case and the cover.

2. The force sensor system of claim 1, wherein:
    the housing assembly defines a sensor cavity within which the sensor is disposed; and
    the sensor system further comprises a force transfer medium disposed within the sensor cavity between the actuator and the sensor to transfer the input force to the sensor.

3. The force sensor system of claim 2, wherein the force transfer medium comprises a gel.

4. The force sensor system of claim 1, wherein the housing assembly comprises:
    a sensor case, the sensor case having the sensor disposed therein; and
    a cover coupled to the sensor case, the cover having an actuator opening formed therein, the actuator extending through the actuator opening.

5. The force sensor system of claim 1, further comprising:
    a substrate disposed at least partially within the housing assembly, the sensor coupled to the substrate.

6. The force sensor system of claim 1, further comprising:
a plurality of leads coupled to the substrate and extending from the housing assembly, the leads configured to electrically couple the sensor to an external system.

7. A force sensor system, comprising:
a housing assembly including a sensor case and a cover, the cover having an actuator opening formed therein;
a sensor disposed within the sensor case, the sensor having an active range and configured to generate a sensor signal representative of a force supplied to the sensor;
an actuator extending and disposed at least partially within, and movable relative to, the housing assembly, the actuator extending through the actuator opening and adapted to receive an input force, the actuator configured, upon receipt of the input force, to move toward, and transfer the input force to, the sensor; and
an actuator travel stop disposed on the housing assembly, and between the housing assembly and a portion of the actuator, the actuator travel stop configured to be selectively engaged by the actuator and, upon engagement by the actuator, (i) limits movement of the actuator toward, and the input force transferred to, the sensor and (ii) transfers at least a portion of the input force to the housing assembly,
wherein:
the actuator travel stop is sized so as to limit the input force transferred to the sensor to a maximum of two times the active range of the sensor, and
the actuator travel stop comprises a shim disposed between the actuator and the cover.

* * * * *